(12) United States Patent
Tamatsu

(10) Patent No.: US 8,899,925 B2
(45) Date of Patent: Dec. 2, 2014

(54) WIND/WATER TURBINE WITH ROTATIONAL RESISTANCE REDUCED BY WIND VANE BLADE

(76) Inventor: Yoshiji Tamatsu, Okinawa (JP)

(*) Notice: Subject to any disclaimer, the term of this patent is extended or adjusted under 35 U.S.C. 154(b) by 0 days.

(21) Appl. No.: 13/702,614

(22) PCT Filed: Jun. 7, 2011

(86) PCT No.: PCT/JP2011/062988
§ 371 (c)(1),
(2), (4) Date: Dec. 7, 2012

(87) PCT Pub. No.: WO2011/155471
PCT Pub. Date: Dec. 15, 2011

(65) Prior Publication Data
US 2013/0136600 A1 May 30, 2013

(30) Foreign Application Priority Data

Jun. 9, 2010 (JP) .................................. 2010-132516
Aug. 10, 2010 (JP) .................................. 2010-179089

(51) Int. Cl.
*F03D 3/06* (2006.01)
*F03B 17/06* (2006.01)

(52) U.S. Cl.
CPC ........... *F03B 17/065* (2013.01); *F05B 2210/16* (2013.01); *Y02E 10/28* (2013.01); *Y02E 10/74* (2013.01); *F03D 3/067* (2013.01); *Y02E 10/721* (2013.01); *F05B 2240/311* (2013.01); *F05B 2240/213* (2013.01)
USPC ................................ 416/119; 416/42; 416/243

(58) Field of Classification Search
USPC ........... 416/40, 41, 117, 132 A, 119; 415/4.2, 415/4.4, 907; 290/44, 55
See application file for complete search history.

(56) References Cited

U.S. PATENT DOCUMENTS 1,076,713 A * 10/1913 Southwick ..................... 416/119
4,468,169 A * 8/1984 Williams ....................... 416/119
(Continued)

FOREIGN PATENT DOCUMENTS

DE 102008027241 A1 12/2008
JP 57-35471 U 8/1980
(Continued)

OTHER PUBLICATIONS

Japanese Office Action for Application No. JP 2010-179089 dated Mar. 1, 2011.
(Continued)

*Primary Examiner* — Richard Edgar
*Assistant Examiner* — Justin Seabe
(74) *Attorney, Agent, or Firm* — Pearne & Gordon LLP

(57) ABSTRACT

A wind/water turbine has a basic configuration in which both ends of blades which are in rotational symmetry are fixed to support plates, the blades have vanes, one of the vertical sides of the vanes is attached to a vane rotating shaft, and the free opposite sides each rotate freely in a sector extending as far as the adjacent vane rotating shafts on either side. The vanes are arranged such that when the blades of the wind/water turbine are convex, moving against the water flow/airflow, the vanes are pressed by the water flow/airflow and are opened, thereby reducing the rotational resistance, and when the blades have pivoted further and are concave, the spaces between the vane rotating shafts are closed, the water/air pressure is received over the entire surface of the blade, and thus a pivoting force that is increased corresponding to the reduction in rotation resistance is obtained.

9 Claims, 16 Drawing Sheets

(56) References Cited

U.S. PATENT DOCUMENTS

| | | | |
|---|---|---|---|
| 4,679,985 A * | 7/1987 | Worms | 416/119 |
| 4,684,817 A * | 8/1987 | Goldwater | 290/55 |
| 5,256,034 A | 10/1993 | Sultzbaugh | |
| 7,083,382 B2 * | 8/2006 | Ursua | 416/110 |
| 8,016,544 B1 * | 9/2011 | Nguyen | 415/60 |
| 2010/0135804 A1 | 6/2010 | Suarez Del Moral et al. | |

FOREIGN PATENT DOCUMENTS

| | | | |
|---|---|---|---|
| JP | 55-160168 A | 12/1980 | |
| JP | 57-035471 U | 2/1982 | |
| JP | 59-103973 A | 6/1984 | |
| JP | 61-237885 A | 10/1986 | |
| JP | 1-208574 A | 8/1989 | |
| JP | 6-229634 A | 6/1994 | |
| JP | 08-232831 A | 9/1996 | |
| JP | 2001-221142 A | 8/2001 | |
| JP | 2002-155849 A | 5/2002 | |
| JP | 2005-120959 A | 5/2005 | |
| JP | 2005-282400 A | 10/2005 | |
| JP | 2006-125378 A | 5/2006 | |
| JP | 2006-291886 A | 10/2006 | |
| JP | 2007-239542 A | 9/2007 | |
| JP | 2007-332871 A | 12/2007 | |
| JP | 2008-202588 A | 9/2008 | |
| JP | 2009-174510 A | 8/2009 | |
| JP | 2009-203968 A | 9/2009 | |
| JP | 2009-264360 A | 11/2009 | |
| JP | 2010-025095 A | 2/2010 | |
| JP | 2010-509526 A | 3/2010 | |

OTHER PUBLICATIONS

International Search Report for PCT/JP2011/062988; Jul. 5, 2011.

* cited by examiner

Section B-B

WIND/WATER TURBINE WITH ROTATIONAL RESISTANCE REDUCED BY WIND VANE BLADE

TECHNICAL FIELD

Wind/water turbine motor which uses wind power and water power as its power source

BACKGROUND ART

Measures to prevent global warming have become an issue not for the distant future but for the near future, and green electricity, which generates little carbon dioxide, is being promoted as a means for suppressing the generation of greenhouse gases, which cause global warming. From the point of view of energy security, and out of concern regarding the current situation in which power generation relies on imports of crude oil from other countries, methods of supplementing power generation by means of sunlight, water power and wind power have been investigated on many fronts with the aim of securing energy that can be provided without external support, and some of those that have been proposed have been commercialized (for example photovoltaic power generation using solar panels, hydroelectric power using dams, propeller-based large-scale wind power generation).

Wind turbines have issues that need to be improved, in that blades that can rotate at high speed do not start rotating readily, while conversely blades that start moving under light wind do not rotate readily at high speed.

In order to improve the wind power utilization efficiency there exist methods for reducing the resistance of a wind turbine when it is moving against the airflow, using techniques in which small windows are opened, but these do not open completely. Thus wind which has exited does not flow out in the rearward direction until it has come into contact with a second wall, and therefore the degree of reduction in the resistance is small and turbulence of the rearward airflow increases.

There are also techniques whereby the resistance of a wind turbine is reduced when it is moving against the airflow by decreasing the surface area of the vanes using another motive force, but this has the complication that it requires a power source and the action of a mechanism to extend and retract the vanes, for example, for each rotation using an 'on'/'off' type of relay, and as this must be performed for each cycle it is difficult for this to function when rotating at high speed.

Another means of airborne power generation uses a method in which a merry-go-round is pulled and caused to rotate, thereby generating electricity, by marine-leisure kites flown above the ground on a number of spindles which are extended when laid on the ground. This method has the problems that it cannot be performed in light wind, requiring wind that is stable and strong to a certain extent, and that each of the kites requires individual specialist handling, and a large area is required.

Another means of airborne power generation uses a system whereby electricity is generated by means of the rotation of an entire balloon, and thus equipment including a motor must be enclosed within the balloon, technical expertise is required in its manufacture, and maintenance is also complicated.

Savonius type wind turbines are characterized in that they generate high torque due to their large wind receiving area, but this is conversely a weakness in that it is difficult to implement countermeasures against strong winds such as typhoons.

There are other means of generating electricity using wind power which are implemented using a large-scale method whereby as a countermeasure against strong winds such as typhoons the wind turbine pylon itself is laid down in advance on the ground, but large losses are generated including stoppages for disaster avoidance.

PRIOR ART LITERATURE

Patent Literature

Patent literature article 1: Japanese Patent 1253060
Patent literature article 2: Japanese Patent Kokai 2007-332871
Patent literature article 3: Japanese Patent Kokai 2009-203968
Patent literature article 4: Japanese Patent Kokai 2009-264360
Patent literature article 5: Japanese Patent Kokai 1989-208574
Patent literature article 6: Japanese Translation of PCT International Application 2010-509526
Patent literature article 7: Japanese Patent Kokai 1986-237885
Patent literature article 8: Japanese Patent Kokai 1994-229364
Patent literature article 9: Japanese Patent Kokai 2005-282400
Patent literature article 10: Japanese Patent Kokai 2001-221142
Patent literature article 11: Japanese Patent Kokai 2005-120959
Patent literature article 12: Japanese Patent Kokai 2007-239542

SUMMARY OF THE INVENTION

Problems to be Resolved by the Invention

Drag type Savonius wind turbines generate high torque, but the rotational speed remains low, and there is a need to resolve the problem that it is difficult to implement measures against strong winds.

Means of Overcoming the Problems

Means have been determined whereby a Savonius wind turbine type of blade or the like is subdivided into oblong sections, one edge of which is fixed and the other edge is in a state in which it flutters in the water flow/airflow, thereby generating high rotation by reducing the resistance when moving against the water flow/airflow.

Further, when the blade has rotated and is concave in order to obtain a rotating force, the oblong surfaces which were open are returned to their original positions, a completely closed surface comprising these is driven and rotation occurs. This force generates a high torque.

When rotation of the water/wind turbine becomes dangerous, for example when the rotation speed is high during a typhoon, the short length (the lateral or horizontal side) of the vanes 8 which were fluttering is reduced to a length such that they do not reach the attachment positions (the vane rotating shafts) of the adjacent fluttering vanes, such that the state in which they flutter in the water flow/airflow can be implemented over 360°, and the ability for all of the vanes to rotate through 360° while fluttering in the water flow/airflow is maintained.

Advantages of the Invention

The method of the present invention whereby safety is ensured rapidly when a disaster occurs, or during dangerous rotation, facilitates a reduction in the time and cost related to disaster countermeasures, for example before, during and after the approach of a typhoon. This has advantages compared with other countermeasure processes such as laying down a propeller power generation pylon before disaster approaches, in that the process of simply winding in the root of the vanes can clearly be performed with a large cost saving in terms of power generation (reduction in operation downtime before, during and after the disaster countermeasure, saving in cost of disaster countermeasure equipment and labor costs, for example), and there is a corresponding cost saving.

There is an advantage in that in regions in which electricity generation using lift type (mainly propeller type) wind power generation installations has been considered but has been deemed unsuitable, the introduction of electricity generation using wind power can be promoted by employing the drag type vertical-axis type equipment of the present invention. For example, even in regions which have been considered for installation of wind-power electricity generation equipment but have until now been deemed unsuitable for installation of a wind turbine, for example if installation of horizontal-axis type, lift-type wind-power electricity generation equipment is difficult due for example to height restrictions or unstable wind direction (for example due to regional characteristics such as seasonal winds, or due to the surrounding geography, or due to variations resulting from wind striking houses and buildings), with a vertical-axis type the installation height limits can be low and the equipment can adapt to mountain winds and winds from four directions, and for example although being of a drag type the speed of rotation can be increased greatly, and thus many business conditions such as profitability can be met. In addition, the most significant drawback of drag-types, namely the difficulty in implementing typhoon disaster countermeasures, can be easily performed simply by means of the configuration of the vanes in the water/wind turbine of the present invention, and since most of the problems have been resolved, installation can be promoted, with the advantages of improvement to the global environment combined with a reduction in the problem of the world's energy security.

According to the present invention, even in remote locations in the suburbs where it is not feasible for power lines to be deployed, provided that there is wind or flowing water it is possible to make use of the energy thereof to the benefit of agriculture or industry as a power source or to generate electricity, and this can contribute to alleviating inconveniences and reducing overall costs, for example.

When the present invention is employed as a water turbine, the depth of water required to obtain a rotational force is not the depth at which the entire blade is immersed in water, but rotation is possible in a state in which only the lower end portion of the blade is immersed in water. Therefore in addition to being usable in almost all rivers and water channels, for example, since it is a vertical-axis type, equipment including a generator can be installed in a large space above the water turbine, and there is the benefit that management, including maintenance during operation, is easy to perform, it can be used in many locations, and it has the advantage that energy problems can be resolved to some extent.

Since as a whole the water/wind turbine of the present invention is lightweight, even in a case in which it is installed on a float which floats on the surface of water and electricity is generated, there is the advantage that overall cost savings of the float equipment and the like can be achieved since the buoyancy can be reduced compared with other types such as a propeller type electricity generating system.

The overall configuration of the drag type water/wind turbine of the present invention is a simple construction comprising sheet-shaped vanes, vane rotating shafts, support plates and a central rotating shaft, and the configuration required to cause these to function, and the techniques to produce them are simple compared with other types. For example the techniques required to install a propeller-type wind turbine, which is a typical lift-type wind turbine, involve modeling the subtle curved shape of the vanes in order to generate lift, and performing complicated balancing thereof, techniques to build a high pylon, and techniques to manufacture and assemble the horizontal-axis bearing components which rotate while supporting the heavy load of the large blades, and in addition difficult techniques such as skilled techniques to perform all maintenance at height are also required.

The water/wind turbine of the present invention has versatility in that it can be used while airborne, on the ground, on the surface of water or below the surface of water, and the basic principles of the present invention can be implemented easily to achieve weight reduction, and the invention has the characteristics of being simple and unified, and it can be produced using materials that can be acquired easily anywhere, including wood and the like, and it can thus be used widely across the world, including in developing countries.

MODES OF EMBODYING THE INVENTION

Figure 1:
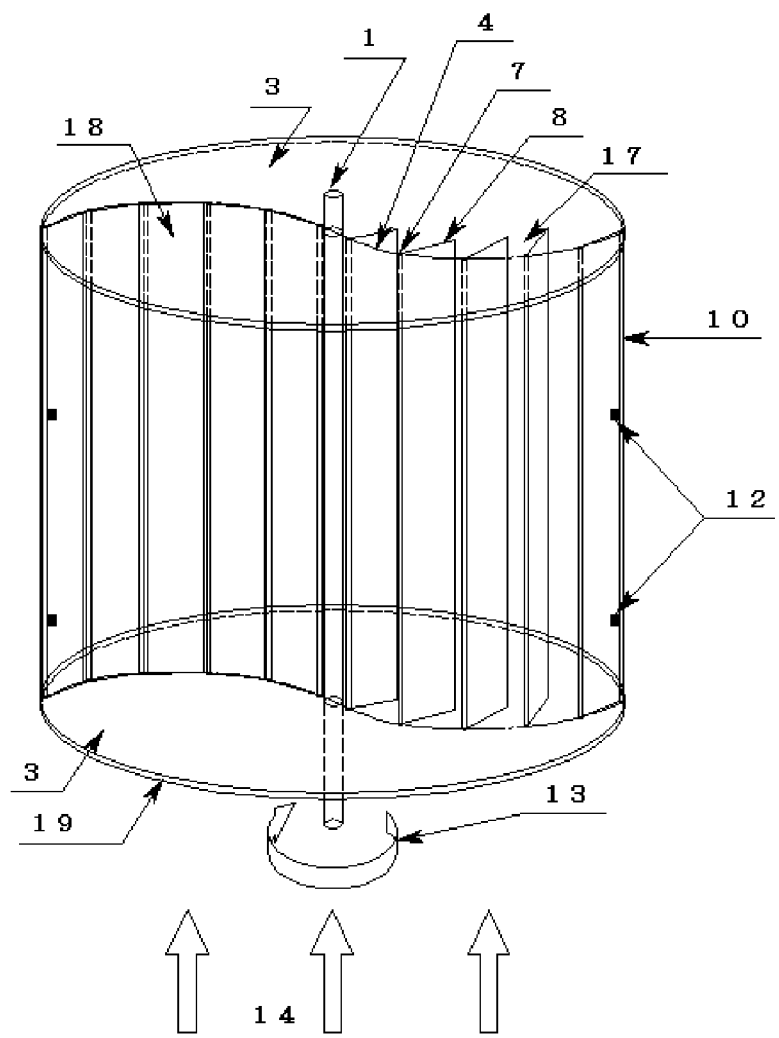
FIG. 1 is a perspective view explaining the basic construction of a water/wind turbine.
Figure 2:
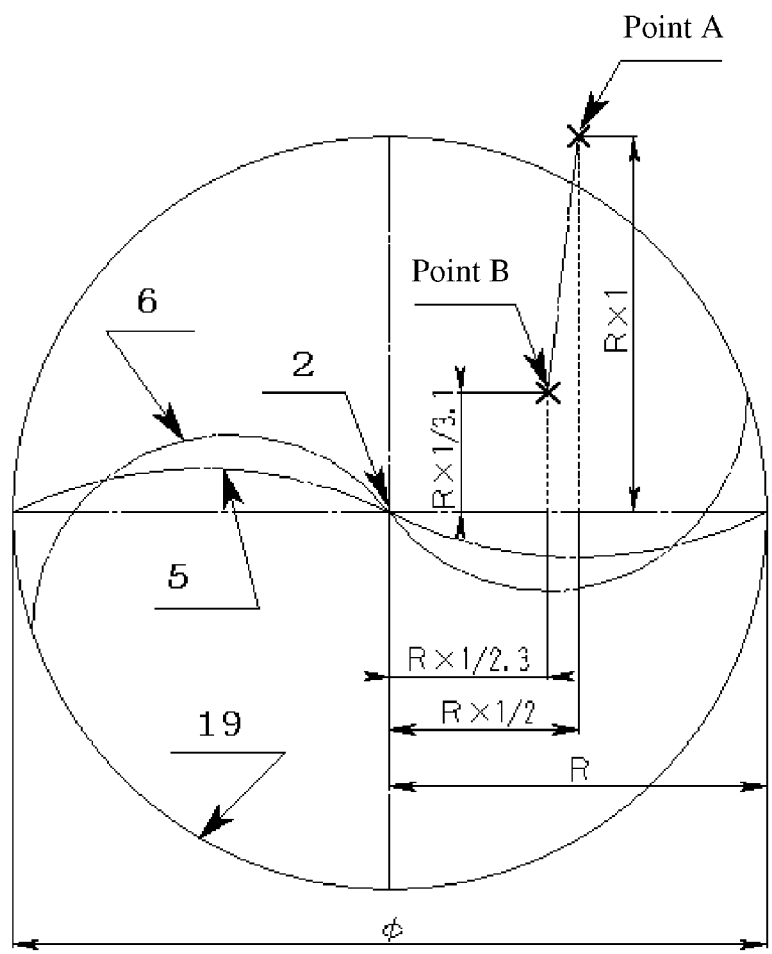
FIG. 2 is a plan view illustrating the method of drawing a blade line shape in a wind/water turbine and the range thereof.
Figure 3:
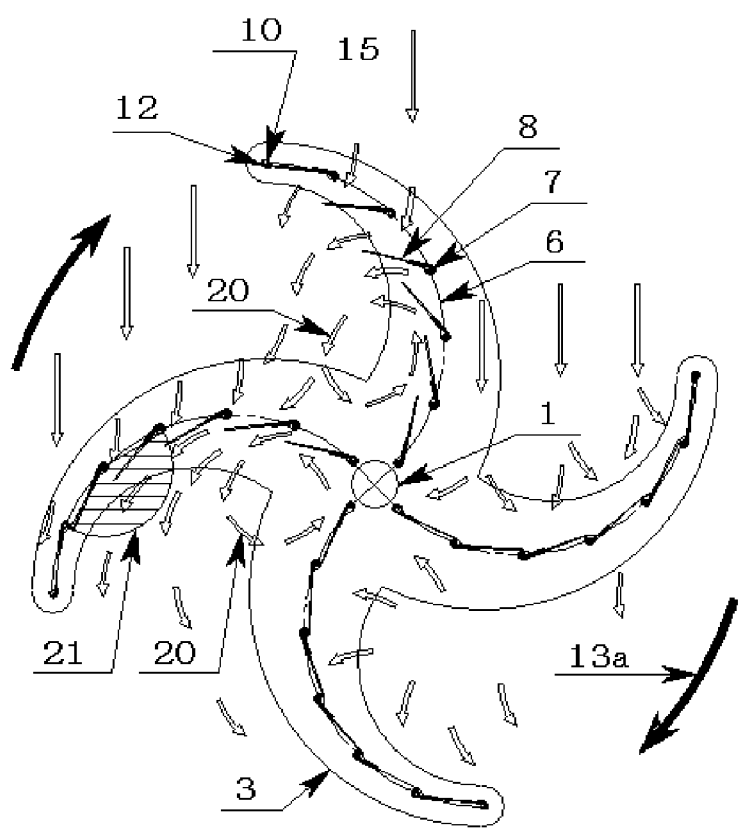
FIG. 3 is a plan view illustrating the airflow and the movement of the vanes during operation when a wind turbine is in use.
Figure 4:
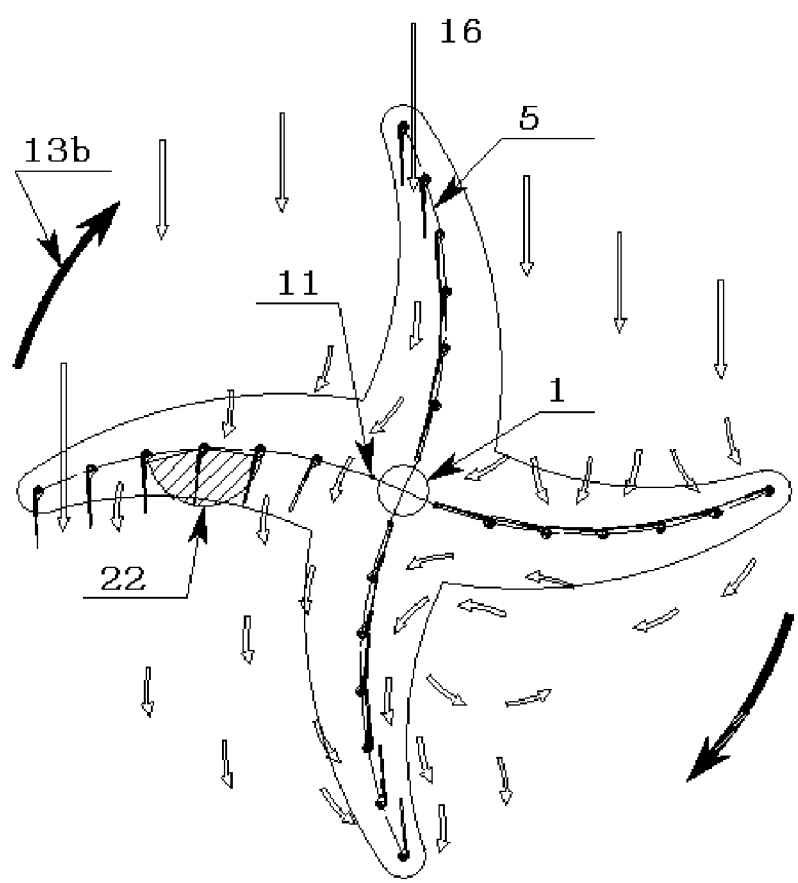
FIG. 4 is a plan view illustrating the water flow and the movement of the vanes during operation when a water turbine is in use.
Figure 5:
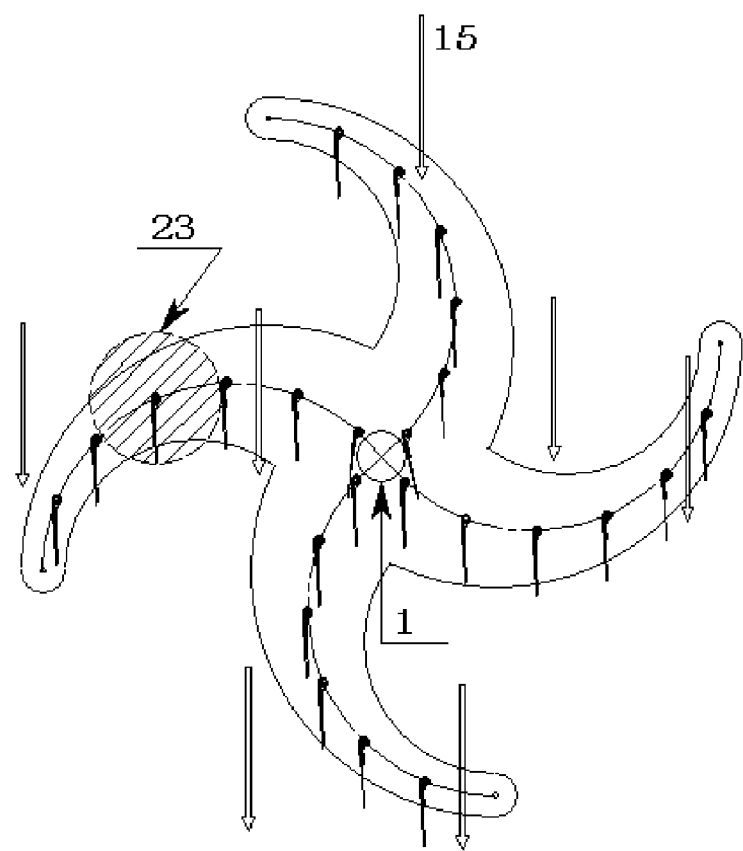
FIG. 5 is a plan view illustrating wind resistance blow-by and the state of the vanes when avoiding dangerous high-speed rotation when a wind turbine is in use.
Figure 6:
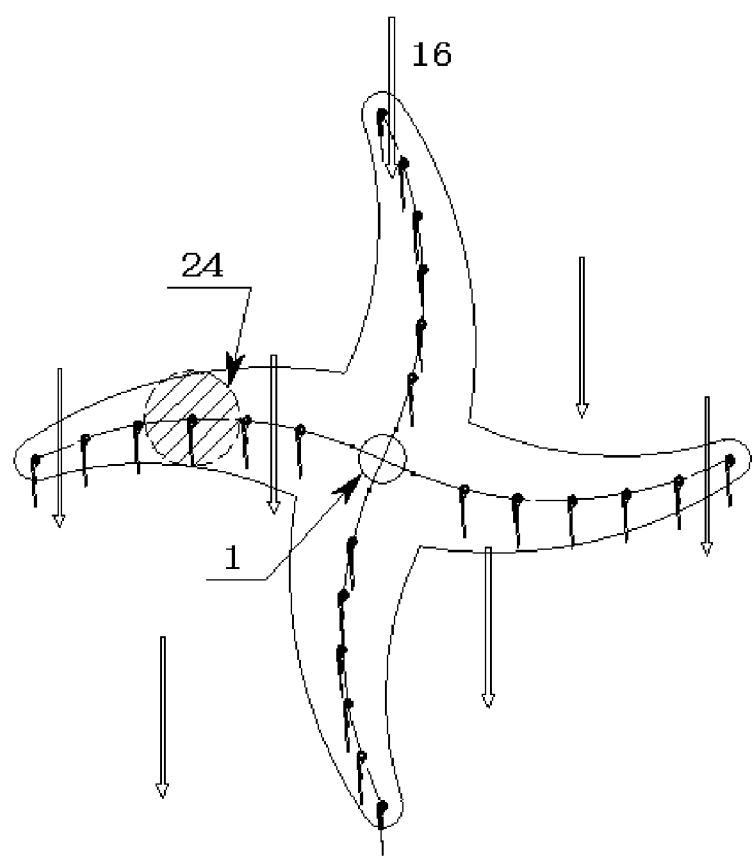
FIG. 6 is a plan view illustrating the state of the vanes when avoiding dangerous high-speed rotation when a water turbine is in use, and the state when bypassing water resistance.
Figure 7:
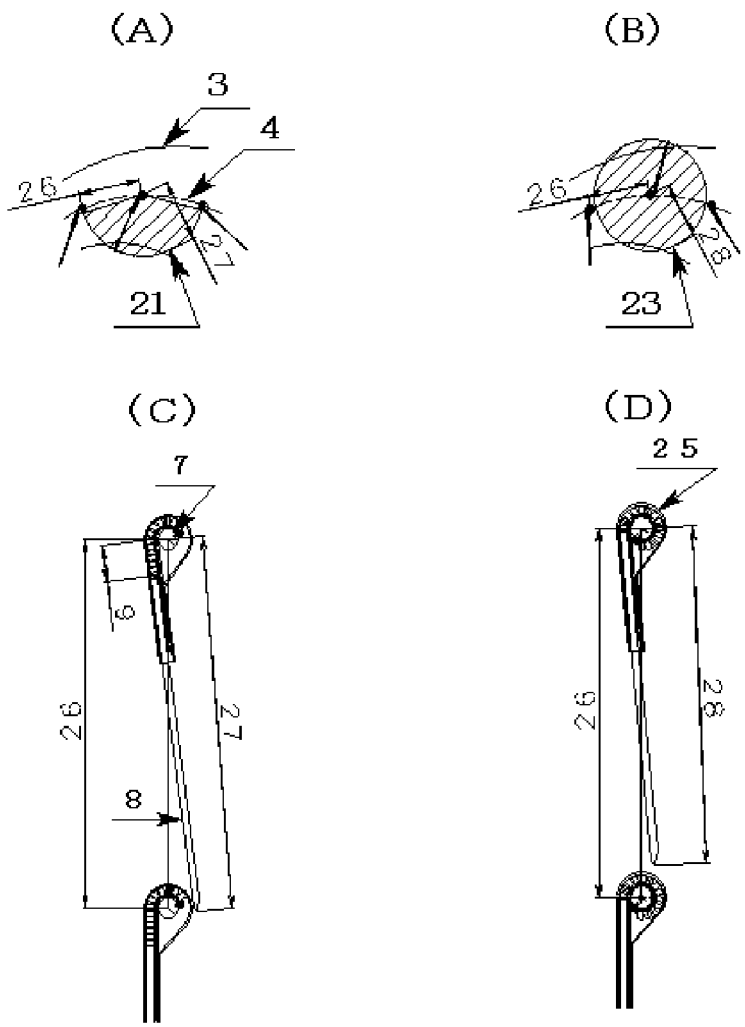
FIG. 7 is a plan view illustrating the range of rotation of the vanes in a wind/water turbine and the details of the variation in the short-side length of the vanes, where Figure A and Figure C illustrate the state during operation and Figure B and Figure D illustrate the state when avoiding dangerous high-speed rotation.
Figure 8:
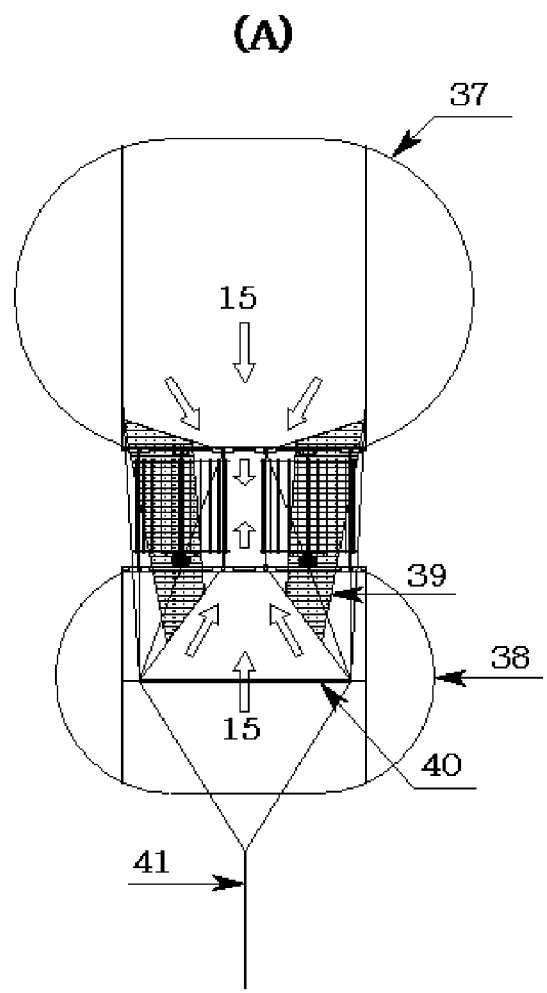
FIG. 8 is a front view of a wind turbine, a balloon and a spoiler in an airborne power generation system.
Figure 9:
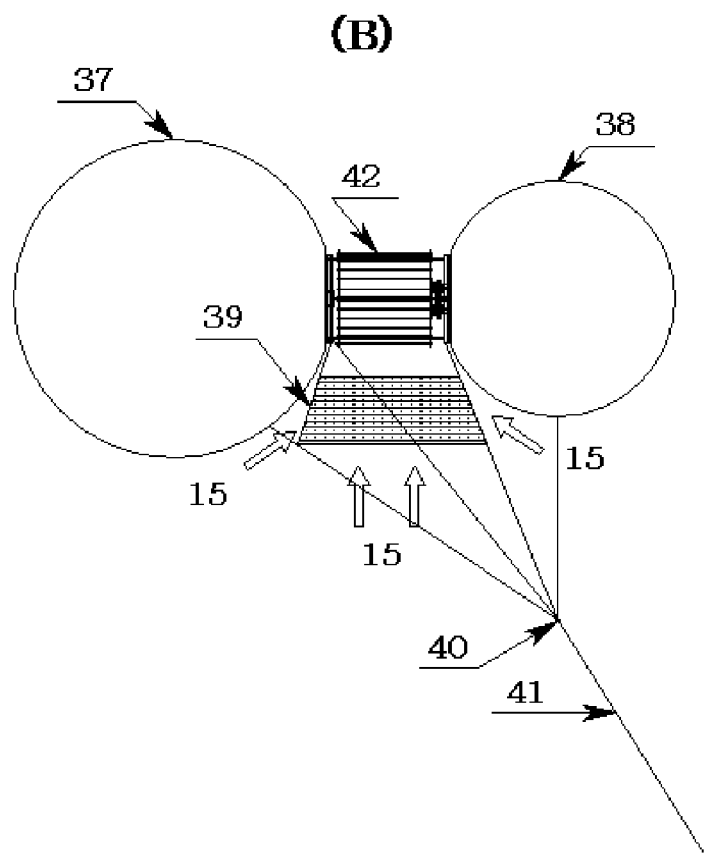
FIG. 9 is a side view of a wind turbine, a balloon and a spoiler in an airborne power generation system.
Figure 10:
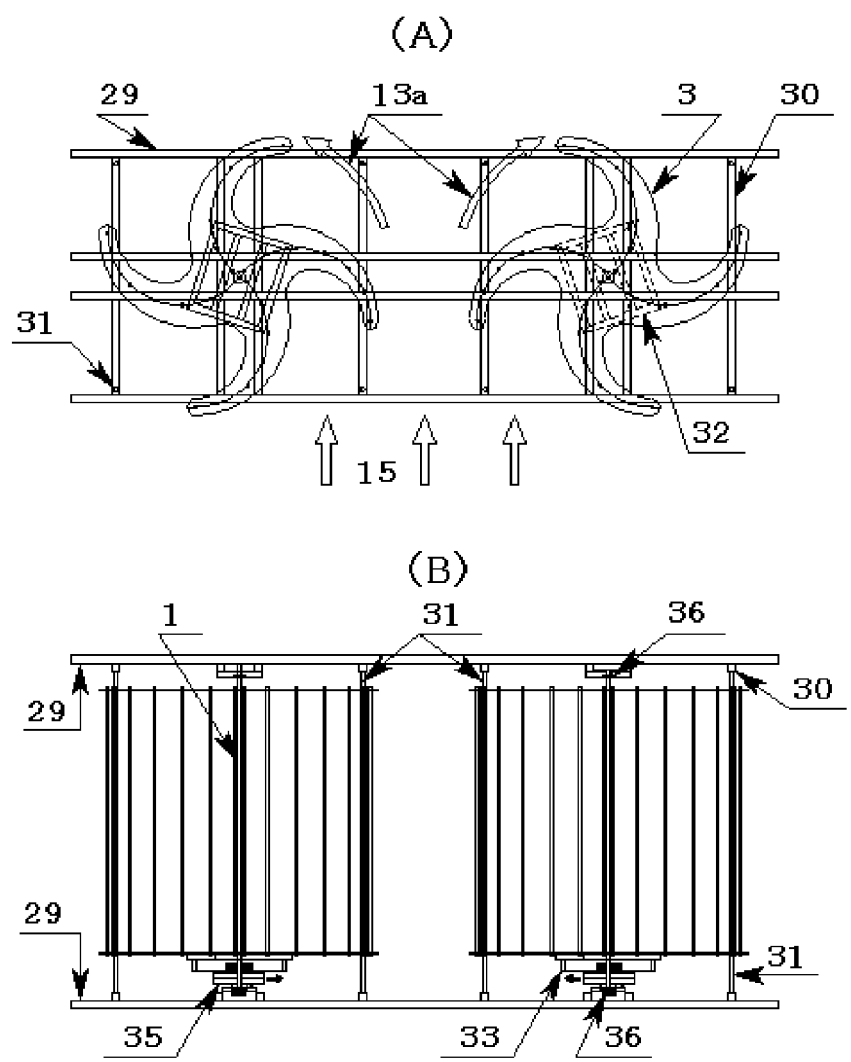
FIG. 10 is a plan view A and a front view B showing in detail a wind turbine and a framework in an airborne power generation system.
Figure 11:
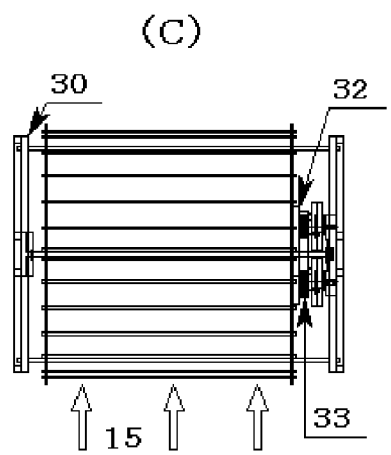
FIG. 11 is a side view C showing in detail a wind turbine and a framework in an airborne power generation system.
Figure 12:
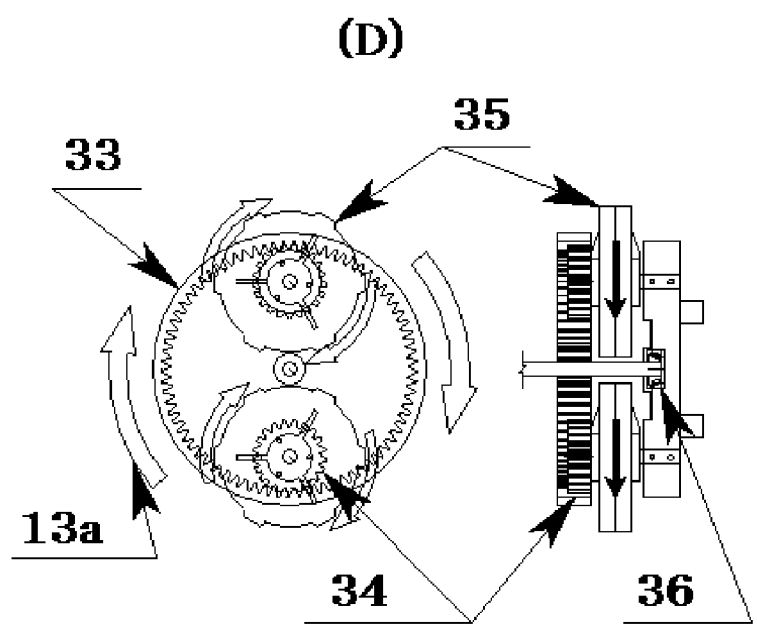
FIG. 12 is a diagram D illustrating a rotation transmission pulley and an electrical generator attached to a wind turbine in an airborne power generation system.
Figure 13:
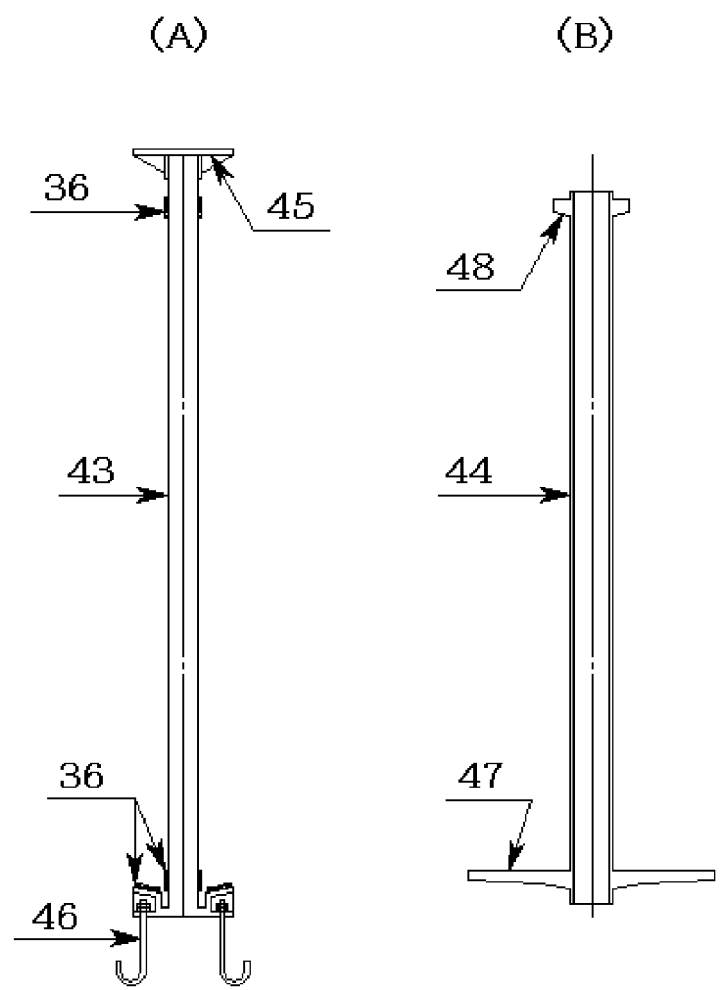
FIG. 13 is a detailed diagram of a rotating shaft 1 in a water/wind turbine parallel power generation system, where Figure A shows a main column and Figure B shows a pipe with rotating shaft flanges.
Figure 14:
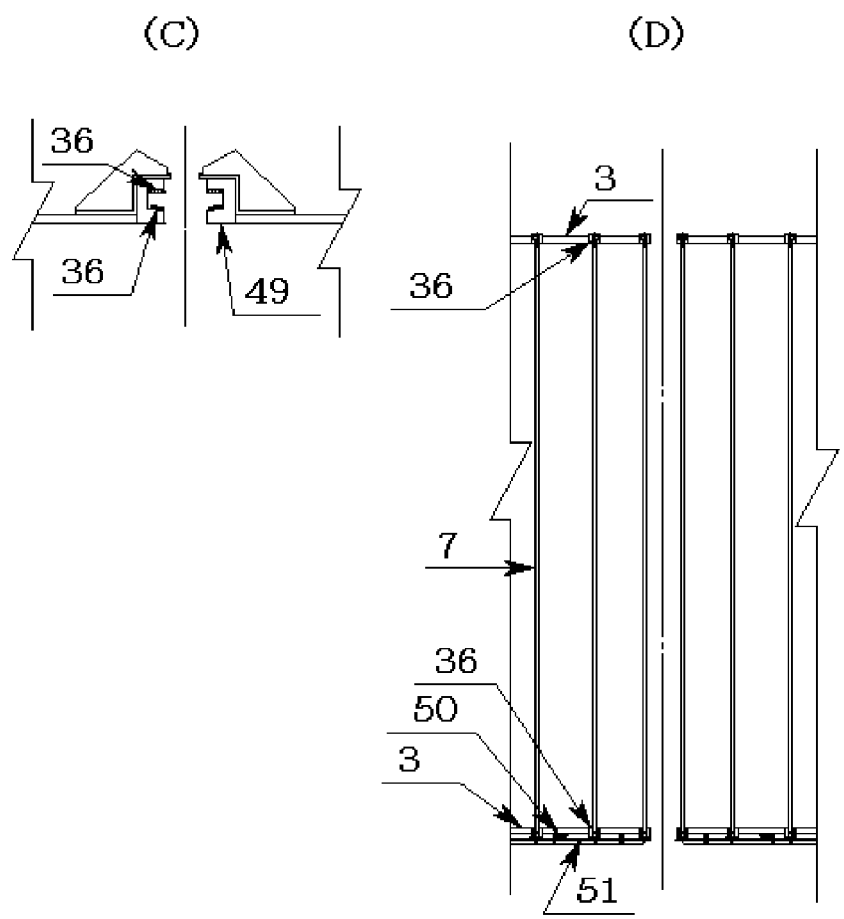
FIG. 14 is a detailed diagram of a rotating shaft 1 in a water/wind turbine parallel power generation system, where Figure C shows a rotating shaft upper fixing in detail and Figure D shows blades in detail.
Figure 15:
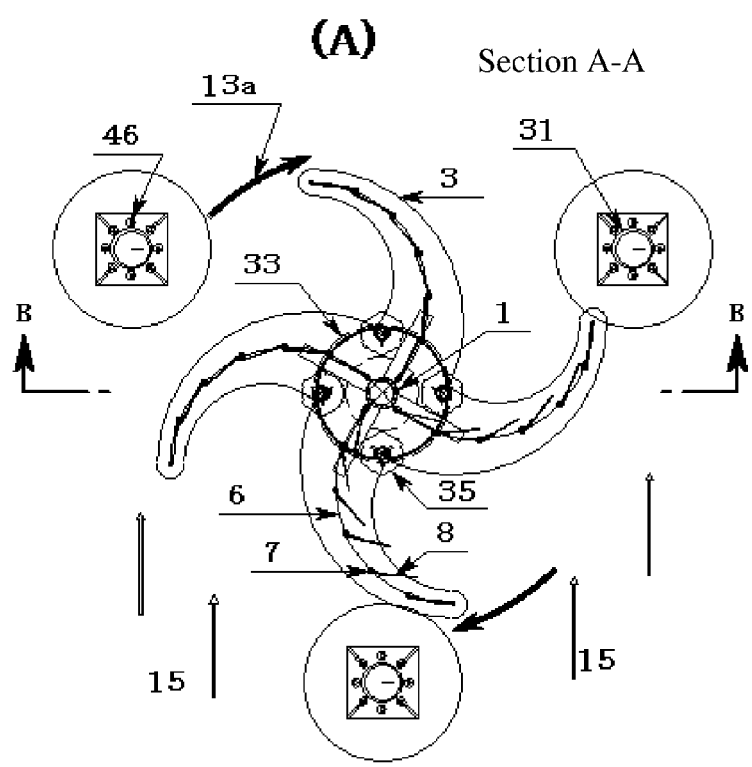
FIG. 15 is a plan view A of a water/wind turbine parallel power generation system.
Figure 16:
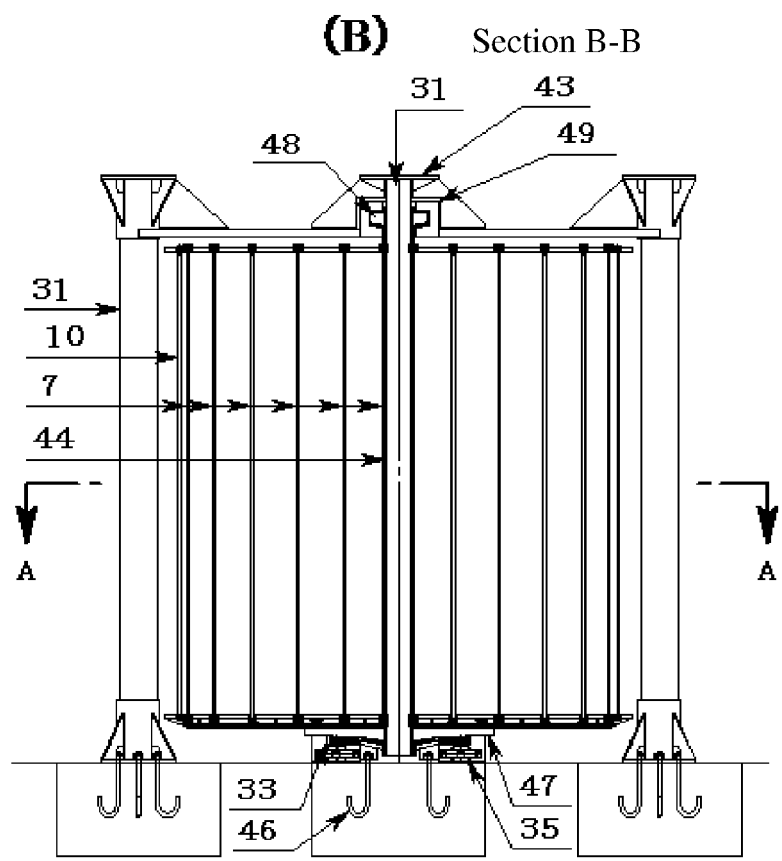
FIG. 16 is a side view B of a water/wind turbine parallel power generation system.
Figure 17:
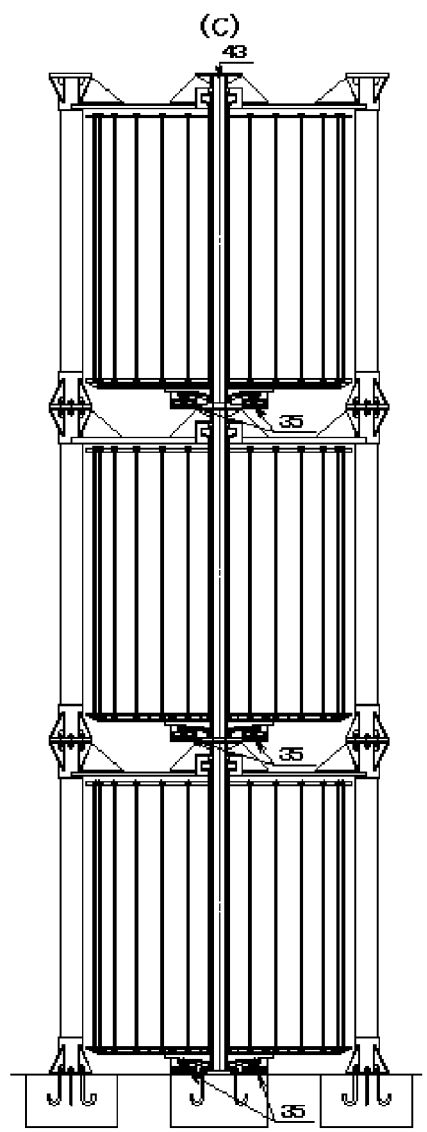
FIG. 17 is a side view C of a boarding structure in a water/wind turbine parallel power generation system.

The form is such that in an operation whereby a cycle in which a wind/water turbine reduces its resistance when moving against the airflow and then inverts and forms a larger driven face when its blade is concave and is receiving a rotational force can be performed repeatedly for each rotation, the operation does not require another new motive force but makes use of part of a force in a natural manner without modifying the flow of the force, before it becomes the pivoting force of the wind/water turbine.

With a Savonius wind turbine, a large-scale operation such as removing the main blades, or dismantling the main body or causing it to lean over, is not required as a countermeasure against strong winds, and a straightforward operation is performed instantaneously simply by winding in the base of the vanes by between approximately half a turn and two turns.

The intended use can be changed from a water turbine to a wind turbine without modifying the outer shell framework or any components, but simplification and unification have been achieved such that in order to increase the rotational efficiency it is only necessary to modify the attachment location of the vanes, starting the vane replacement position from the center of the circle for a wind turbine, and disposing them in order from the outer circumferential side.

It is known that when being used as a wind turbine, rotation can be caused more stably, more strongly and for longer when wind is received in the sky rather than on land, where there is much standby time with no wind. The wind/water turbine of the present invention achieves a reduction in weight by means of a form that does not require an additional new power source in order to perform a sequence of operations to generate electricity using wind power efficiently by reducing the rotational resistance, and in addition further reduction in weight is achieved by the vanes comprising the blade having the structure of a bird's flight feathers, resulting in a form which allows the generation of electricity efficiently even when airborne.

EMBODIMENT 1

The wind/water turbine according to the present invention has a basic configuration in which both ends of blades which are in rotational symmetry around a central rotating shaft are fixed to support plates on an arcuate circular arc, but the blades consist of a number of vanes, one of the vertical sides of the vanes is attached to a vane rotating shaft, and the vanes open and close automatically, and thus the wind/water turbine has a configuration whereby it rotates efficiently.

The wind/water turbine is of the vertical-axis type and has a construction in which an extension of a blade line shape 4 comprising arcuate circular arcs that are rotationally symmetrical around a rotating shaft 1 is split into three or more preferably equally spaced intervals at the boundaries between which are inserted vane rotating shafts 7, both ends of which are fixed by support plates 3, one of the vertical sides of lightweight vanes 8 is attached to each of the vane rotating shafts 7, the opposite side is free and the range of rotation thereof is a sector-shaped range extending as far as the adjacent vane rotating shafts on either side, on the side of the center point of the circular arc of the blade line shape 4, and one blade set comprises the abovementioned vane rotating shafts 7 and vanes 8 aligned on the blade line shape 4 on one side of a boundary comprising the rotating shaft 1.

When the convex side of the blade is facing an airflow the vanes 8 open and pivot, and when the concave side of the blade of the wind turbine is facing the airflow, wind flows around to the inside of the circular arc of the blade line shape 4 before the blade becomes concave, thereby causing the vanes 8 to become aligned facing in the direction opposite to the direction of the wind which blows from the front, and in this condition the spaces between the vane rotating shafts are blocked, forming a driven face. The driven face receives a rotational force by wind being blown thereinto, and it rotates about the rotating shaft 1.

When the convex side of the blade is facing the flow of water the vanes 8 open and pivot, and the blade of the water turbine begins to become concave; as the blade pivots, the vanes 8 gradually begin to close the spaces between the rotating shafts, from the rotating shaft 1 side along the circular arc shape, in line with the strength of the water flow, and when the whole of the blade is directly facing the water flow, since the blade has a circular arc shape a driven face is formed in an orderly fashion at the speed at which the vanes 8 on the downstream side half of the blade line shape 4 close. The maximum rotational force is obtained when the water flow hits the completed driven face which has rotated without changing, and rotation about the rotating shaft 1 occurs.

The rotation region over which a rotational force is obtained using the circular arc shaped driven face of the blade has a shape characteristic such that it is larger than a straight-line blade (slightly larger than) 180°. In addition to the above, the impacts resulting from the relationship between the vanes 8 and the water flow when the driven face is formed by the vanes 8 and when it is released are dispersed because the blades gradually open/close one at a time, not all at the same time, due to the circular arc shape of the blade, and the overall flow occurring inside the blade exhibits a smooth flow due to the streamlined shape comprising a circular arc, and thus the water turbine pivots smoothly with a long driving force maintained in the circular arc, while impacts are alleviated. In comparison, with a straight-line blade the vanes open and close at the same time and the driving force is received after the position at which the blade is directly in line with the water flow, and a phenomenon is exhibited whereby the force is lost all at once along the oblique face of the straight-line blade at an oblique angle that is approximately 135° back from this position, and therefore there are weaknesses in that the rotation region over which a rotational force is received is smaller, and the impact at this time is larger, and the water/wind turbine of the present invention aims to improve these aspects.

The shape of the blade line shape 4 which forms the circular arc of the blade is preferably an arcuate blade line shape 4 along a circular arc extending from the center point of the circle of the support plate 3 to the outer circumferential circle thereof, where the center point around which the circular arc comprising the circular arc of the blade is drawn is located approximately on a line joining a point A and a point B, where the point A is a point located at a distance equal to the radius R of the circle of the support plate 3, perpendicular to the radius from a starting point which is halfway along the radius R, and the point B is a point located at a distance equal to 1/3.1 times the radius R of the circle of the support plate 3, perpendicular to the same radial line in the direction of the point A from a location which is R×1/2.3 from the center of the circle towards the outer circumferential circle side.

The choice of blade is a blade line shape 4 tailored to whether it is for wind or water, and to the intensity thereof, and a wind/water turbine has two or more blades having the same shape, namely the blade line shape 4, arranged in rotational symmetry.

For the vanes 8, importance is placed on overall weight reduction, and weight reduction is achieved in particular such that when employing wind power, the blades are moved easily to the upwind side by means of wind which flows around to the inside of the circular arc when the blade line shape 4 is in a location approximately the same as the upwind direction; and the vanes 8 as a whole are constructed in the shape of a sheet, produced from a material having a bending strength at least sufficient that they do not break and go through the span between the vane rotating shafts.

The vanes 8 are arranged such that one of the long sides of a vane 8, the length of which in the long-side (vertical side) direction when taken preferably as a rectangular shape is slightly shorter than the length between the support plates 3 at either end of the vane rotating shaft 7, is attached.

The length 27 of the vanes 8 in the short (lateral=horizontal side) direction is slightly longer than the length of the circular arc intervals (=the distance 26 between vane rotating shafts) of the blade line shape 4, and this sets the function and shape of the blades 8, having a range of rotation 21 of the blades when operating as a wind turbine, and a range of rotation 22 of the blades when operating as a water turbine, where the free distal end in the length direction on the side of the center point of the circular arc of the blade line shape is free to rotate individually in a sector shape between the vane rotating shafts 7 on the left and right sides.

Allowing freedom to rotate within a sector-shaped range of vane rotation 21 when operating as a wind turbine or range of vane rotation 22 when operating as a water turbine, when the water/wind turbine of the present invention is operating, means that part of the vane 8 in the vicinity of the vane attachment portion is made from a material which can bend, and rotation occurs due to bending thereof; or the vane rotating shaft 7 is covered with a pipe which is caused to rotate; or a hinge or similar fixture is attached at the connecting portion between the vane rotating shaft 7 and the vane attachment portion and is caused to rotate; or fixtures are attached which allow the vane rotating shaft 7 itself to rotate on part of the support plates 3 at either end, and it is thus caused to rotate.

In order to increase the rotational function of the wind/water turbine, the vanes 8 are made from a lightweight, high-strength fibrous material such as fiberglass or carbon fiber based on the structure of the hook-shaped projections, barbs and barbules, of birds' flight feathers, as an object formed integrally using resin or the like having an overall sheet-like shape, or a sheet comprising polypropylene or fluororesin, or a sheet comprising a fabric such as a cloth or the like, and in particular vanes 8 specifically for wind are made lightweight such that they rotate readily when subjected to wind (corresponding to level 1 on the Beaufort wind force scale) which impinges over the surface area of the vane 8 in a state in which one of its vertical sides is fixed to a rotating body such as a vane rotating shaft 7. In addition, the vanes 8 are made in the shape of a sheet produced from a material having a bending strength at least sufficient that when the blade of the wind/water turbine is concave and is being driven by the force of water or wind, the vanes which are lying across the spaces 26 between the vane rotating shafts on the blade line shape 4 do not break and go through the spaces.

By forming the shape of the vanes 8 as a single sheet, when the blade is convex and a vane 8 is fluttering in the water flow/airflow, fine disturbances in the wind or water flowing to the rear of the vane become laminar flow, increasing the speed of flow on the rearward side of the wind/water turbine, and thus by promoting the speed of flow in such a way that the speed of flow at the front surface is dragged forward, the energy of the wind/water turbine (said to be the cube of the wind speed) is generated efficiently.

Depending on the intended use, the vanes 8 may also be such that part of the vane 8 in the vicinity of the vane attachment portion comprises fibers, resin, rubber or another soft material that can be wound several times around the vane rotating shaft 7, or a material having tensile strength that can be drawn in, and the remainder of the vanes 8 apart from in the vicinity of the vane attachment portion is in the shape of a sheet. Tensile strength as mentioned above means strength such that the vanes 8 are not torn away from the vane attachment portion when they are in a state in which they are receiving the force of the water flow/airflow while being caused to flutter by the water flow/airflow, or when the vanes 8 are in a state in which substantially the whole surface of the vanes 8 is receiving the force of the water flow/airflow such that the vanes 8 are open or closed, centered around the vane rotating shaft 7, by means of the force of the water flow/airflow.

The length which is wound several times onto the vane rotating shaft 7 is a retraction length 9 whereby the length is reduced such that the free distal end portion of the vertical side of the vane 8 does not come into contact with the adjacent vane rotating shafts 7 on either side.

If necessary, in order to adjust the tilt of the vanes 8 when open, adjustment is made possible using the intensity of a lifting force generated by causing the side on which the tilt is required to become bulged into a streamlined shape, or adjustment is effected by attaching a small spoiler to the vanes 8 and increasing the spoiler effect by opening a hole in the vane 8 at the location in which the spoiler has been installed.

If necessary, in addition to arranging that the form of the sheets is similar to a bird's flight feathers, with hook-shaped projections, barbs and barbules, the vane 8 sheets themselves may be provided with a noise reduction effect by employing materials and material assembly similar to an assembled configuration in which objects similar to down are attached using glue at points with which the vanes 8 come into contact causing noise.

If necessary, measures are taken such as increasing the noise reduction effect of the vane sheet itself, or attaching with glue to surfaces around the vane rotating shaft 7, or at other points which the vanes 8 strike when opening or closing freely, a cushion material such as a high foam polyethylene sheet or a sound absorbing material machined into a soft wool-like material similar to bird down using resin and fiber, for example.

If necessary, with the aim of improving the rotational force when the water/wind turbine is rotating or to reduce the level of noise generated, the cross-sectional shape of the vane rotating shaft 7 is made into the shape of a sheet such that it is in a straight line with the vanes 8 when they are being caused to flutter by the water flow/airflow, or it adopts a streamlined shape such that the flow resistance of the surface of the vane rotating shaft 7 is reduced. Also, if necessary, the flow of air is adjusted by drawing convex lines on the surface of the vane rotating shafts 7 and the vanes 8 in line with the airflow, or rearward streamlining and noise reducing properties are provided by aligning thin soft projections on these lines (the lines on adjacent vanes 8 are different from each other).

The present invention can be employed as a water or wind turbine, and the intended use can be changed from a water turbine to a wind turbine without modifying the outer shell framework or any components. However, in order to increase the pivoting efficiency of the water/wind turbine, when used as a wind turbine the pivoting efficiency is increased by locating the center point of the arcuate blade line shape 4 closer to the point B than the point A, installing the vanes 8 starting with the vane 8 of the vane rotating shaft 7 on the water/wind turbine rotating shaft 1 side, and arranging that the shaft at the distal end portion is a shaft 10 for simple fixing of a vane 8.

In the same, in order to increase the pivoting efficiency of the water/wind turbine, when used as a water turbine the center point of the arcuate blade line shape 4 is located closer to the point A than the point B, the vanes 8 are attached starting with the vane 8 of the rotating shaft 7 furthest away from the water/wind turbine rotating shaft 1, and the vane rotating shaft 7 closest to the water/wind turbine rotating shaft 1 is a shaft 11 for stopping vane rotation, but simple fixing of a vane, performed for use as a wind turbine, is not performed.

The difference between the attachment position of the vanes and the circular arc shape of the blade line shape 4 for the wind turbine and the water turbine is that in the case of a water turbine, use is made of the fact that, since the downward flow resistance of water is greater than that of air, all of the free distal end portions of the vertical sides of the vanes 8 flutter across to the water/wind turbine rotating shaft 1 side at the same time when the blade approaches the upstream side.

The difference between the attachment position of the vanes and the circular arc shape of the blade line shape 4 for the wind turbine and the water turbine is that in the case of a wind turbine, since the downward flow resistance is less than that of water, the distal end portions of the vanes 8 are guided together from the center of the water/wind turbine toward the outside, exhibiting a movement behavior whereby the tilt of the vanes 8 is aligned. This is a phenomenon that is exhibited as the movement behavior described above, through the action of individual factors, two or more factors, or a synergy thereof, the factors being: centrifugal force; a vortex 20 which is captured in the inner portion of the circular arc shape of the blade line shape 4 when the water/wind turbine rotates; wind which flows around to the inside of the blade 8 furthest toward the outer circumferential side, which is fixed simply (open during strong wind); wind which blows between a blade and a blade immediately before the blade changes from convex to concave, and flows around to the inside of the circular arc; wind which blows onto vane rotating shafts 7 that are coming into alignment vertically, facing the airflow at the same time; wind which flows around to the inside of a vane rotating shaft 7 and attachment portion of a vane 8 on the rotating shaft 1 side, an entrained wind which pulls in the adjacent blade 8, which is below on the rotating shaft 1 side. In addition, with a wind turbine the tilt of the outer vane 8 which is fixed simply is already in a state in which it is tilted towards the rotating shaft 1 side when the blade becomes convex and moves against the airflow, and since it is in a state similar to that when a sail receives wind when a sailing boat is moving against the airflow, it also has an additional force propelling the rotation of the wind turbine.

The support plates 3 of the wind/water turbine may be modified variously according to the application, in addition to employing the benefit whereby force is adequately captured by being enclosed widely in the circular arc space formed by the blade line shape 4 and the upper and lower support plates 3 which are in the shape of circular plates. For example, in addition to the aim of capturing the force which enters from the four directions and the upper and lower oblique directions of the water/wind turbine, in order to reduce the water/wind pressure rotational resistance provided by the support plates 3 themselves, excess portions are ground off to the extent that this does not cause problems to the overall structure of the water/wind turbine, the support plates 3 are shaped taking account of the balance in rotational symmetry about the rotating shaft 1, and the ground cross sections are preferably finished to a streamlined shape in which corners have been removed.

The support plate 3 from which excess portions have been ground off may be subjected to a bending process, forming any shape that can have rotational symmetry, including quadrilateral, octagonal, trapezoidal, circular, elliptical shapes or shapes comprising a combination thereof, as the shape of the outer shell as seen from the horizontal direction of the water/wind turbine rotating body, and each of these can be installed in a suitable space or opening.

In the support plates 3 of the wind/water turbine, the separation between the upper and lower support plates 3 may be different from the rotating shaft 1 along the blade line shape 4 to the outer circumferential circle, but the invention may be implemented without changing the basic configuration provided that at each location one of the vertical sides of the vane 8 having vertical sides of a length adapted to be slightly shorter than the length of the vane rotating shaft 7 on the inside of the upper and lower support plates 3 is attached, and in addition the vertical side of the vane 8 opposite to the attachment portion side is truncated such that it does not impinge on the upper or lower plates 3 when rotated through 360° about the vane rotating shaft 7.

Work and power generation may be performed in many locations by installing wind/water turbines having the various shapes in ventilation openings or drainage pipes of buildings or factories, for example, or installing wind/water turbines having a suitable shape to make use of any opening in which rotational motion can be performed.

When the wind/water turbine according to the present invention, in which the resistance is reduced in the direction of the water/wind when the blade is convex, is used for example for the intended uses, it should be noted in particular that it is characterized by being better than other wind/water turbines in that it does not interfere to the same extent as other wind/water turbines with the original aim and function for which the water/wind channel opening such as a pipe was installed, because the vanes 8 are always open when the blade occupying the vertical semicircular section which receives the resistance in the direction of the water/wind is convex, and discharge can also occur from there in the rearward direction, and thus the effective cross sectional area of the pipe or other water/wind channel is increased.

When the water/wind turbine of the present invention is close to the range of dangerous rotation, or if an emergency occurs such as strong winds when a typhoon is approaching, or a flood, for example, the vicinity of the blade attachment portion, in the construction of the vane 8, is wound in or retracted by the retraction length 9. Thus the vanes 8 are in a state having a length 28 such that they do not come into contact with the vane rotating shafts 7 on the left or right sides, and the rotational force of the wind/water turbine is lost in a state in which all of the vanes are free through 360° around the vane rotating shaft 7 and flutter in the water flow/ airflow, and the resistance of the wind/water turbine itself to the water flow/airflow is greatly reduced, ensuring the safety of the equipment as a whole. Changing from the operating condition to ensuring the safety of the equipment as a whole, as described above, is achieved by retracting the vicinity of the vane attachment portion or winding in onto the vane rotating shaft 7 through between approximately half a turn and two turns, and thus countermeasures can be implemented quickly and easily.

By increasing or decreasing the number of vanes 8 which can rotate freely through 360° uniformly for each blade, where vanes 8 are allowed to rotate freely through 360° around the vane rotating shaft 7, it is possible to control the speed of rotation of the water/wind turbine using the driven surface area of the remaining vanes.

In addition to the method of avoiding danger in the wind/water turbine, the wind/water turbine may be stored at the same time that the wind/water turbine avoids danger. The method involves providing a rotating function to a support plate perpendicular axis disposed such that it is horizontal and approximately perpendicular to a line joining the center point of the rotating shaft 1 and the center points of the vane rotating shafts 7, on the upper and lower support plates 3 of the wind/water turbine and the attachment portion of the vane rotating shaft 7. Taking the line joining the center points of the vane rotating shafts 7 and the center point of the rotating shaft 1 as the center, in a position on the support plate 3 having the vane rotating shaft 7 at its center, an opening portion is provided such that when the blade is stored, the vane rotating shaft 7 does not impinge upon the support plate 3. The size thereof is such that its width is slightly larger than the diameter of the vane rotating shaft 7 and its length is a length such that at the lower support plate 3 it has some margin in length downward (indicating the bottom of the vane rotating shaft 7) from the lower support plate perpendicular shaft, and at the upper support plate 3 it has some margin in length over the height such that it extends upward (indicating the top of the vane rotating shaft 7) from the upper support plate perpendicular shaft. Thus in the storage of the vane rotating shafts 7, the bottom and top of the vane rotating shafts 7 are stored in the support plates 3 while moving toward the rotating shaft 1 substantially parallel to the rotating shaft 1 by means of the support plate perpendicular shaft of the vane rotating shaft 7 disposed on the upper and lower support plates 3, as the blade becomes folded.

With the support plates 3 having excess portions ground off, in a position between the vane rotating shaft 7 closest to the rotating shaft 1 and the next vane rotating shaft 7, and approximately perpendicular to the rotating shaft 1, and with a shallow circular arc of the blade line shape 4 having its center point close to the point B, an incision is introduced at an angle such that the distal end of the folded blade becomes stored as close as possible to the center of the rotating shaft 1, and a rotation tool is attached in the incision. The construction is such that each blade can be folded up or down or both up and down by means of this tool. When as described above the blade is folded both up and down, each blade is arranged such that the vane rotating shafts 7 become stored in the support plates 3 without coming into contact, around the support plate perpendicular shaft, using the openings that have been cut out in the support plate 3, and the wind/water turbine can be stored up, or down, or up and down, toward the central rotating shaft 1 side. By means of the abovementioned wind/water turbine storage method, the space that has been vacated by storing the wind/water turbine from its extended state can be released as another workspace, and danger can be avoided by storing the wind/water turbine.

The storage method is only possible because of the form wherein the vane rotating shafts 7 and vanes 8 aligned along one side of the blade line shape 4, bounded by the rotating shaft 1, comprise one blade set, and the vanes 8 can be stored by arranging that they overlap and face in the same direction.

When the water/wind turbine of the present invention is used as an airborne electricity generating device all of the material is a lightweight high-strength fibrous material such as carbon fiber or the like, and the weight of the entire wind turbine can be reduced by forming it integrally using resin or the like. A construction in which a framework of furring strips 29, cross rails 30 and supporting columns 31 is fixed to or integrated with two wind turbines arranged in parallel in order to secure wind turbine rotation space and increase the structural strength can be made to float in the sky by attaching balloons to the upper and lower outer surface portions or to a single position on the upper portion. The abovementioned floating tow rope is divided into two before it reaches the balloons, forming an isosceles triangle with a carrying pole 40, to the two ends of which are tied two ropes, spanning the position corresponding to the base, and in addition several ropes are stretched uniformly from said two ends to main points on the balloons and on the abovementioned framework, and adjustment is performed such that the tow rope which extends from ground level is at the center of the airborne electricity generating device. Spoilers 39, comprising a sheet or the like which is stretched at an incline devised such that the airflow is concentrated at the center of the two parallel wind turbines, are installed using the ropes which are stretched from the abovementioned carrying pole 40 to the wind turbine side, thereby maintaining a state in which the rotational force due to the concentrated airflow directed at the middle of the parallel wind turbines is increased, and thus electricity can be generated using stronger, more stable high-altitude driving wind.

When used as an airborne electricity generating device, by arranging that the countermeasure for avoiding danger during a time of emergency is to lower the device from the sky by retracting the tow rope, weight can be reduced as the device is not required.

When the water/wind turbine of the present invention is used in a system in which it floats on the surface of water, in addition to installing the wind turbine on a float and using it to generate electricity or using it as a motor for pumping or the like, in locations in which river currents or ocean currents, for example, occur below the position in which the float is installed, it is possible to secure a greater amount of work or amount of power generation by means of the motion above and below the water by installing a water turbine below the surface of the water.

With the operation method in which water/wind turbines are installed above and below a float, the site conditions are very different, namely on the water and below the water, but much of the basic configuration is similar, the only difference being the attachment locations of the vanes, and this has the merit that the same maintenance can be performed using the same components, and so maintenance management is simplified.

Instead of making a direct coupling to the water/wind turbine rotating shaft 1 when the wind/water turbine is operating as a power source or as an electrical generator, it is possible to install rotation transmission pulleys 33 or rotating drums having a size equal to or larger than the internal diameter of the water/wind turbine rotating shaft 1 on the support plates 3 at both ends of the wind/water turbine blades or on either one thereof, making maximum use of the spare surface area of the upper and lower support plates 3 in a vertical-axis type device, and to transmit the rotational force using a belt or a drive pulley 34 which is smaller than the abovementioned pulley and which rotates concomitantly with the rotation of the wind/water turbine, inside or outside the rotation transmission pulley or rotating drum, thereby increasing the rotation of the electrical generator 35 or the power source, and since the internal diameter of the rotation transmission pulley and the rotating drum is increased, it is correspondingly possible to install one or more power recovery positions or electrical generators or the like.

The wind turbine of the present invention is a vertical-axis drag type, and it thus has the characteristic of generating high torque, and in order to extract this motive force efficiently a step-up gear may be installed between the water/wind turbine and the electrical generator, thereby allowing efficient electricity generation to be performed with each machine linked via the rotating shaft.

The wind/water turbine makes use of the characteristics of vertical-type wind turbines, as a wind/water turbine motor operated as a multi-stage system having a tower-like structure arranged in a column, where one vertical span comprises a unit having a construction wherein a main column 43 is placed in a location corresponding to a central axis and is covered by a pipe with rotating shaft flanges 44 which is slightly larger than the diameter of the main column, where a space is provided between the main column 43 and the covering pipe such that bearings 36 which allow the water/wind turbine to rotate can be provided in said space, and in this state the support plates 3 of the water/wind turbine are linked to and integrated with the pipe with rotating shaft flanges 44. The support for the tower-like structure is somewhat larger than the outer circumferential circle of the wind turbine, comprising three or more supporting columns installed in positions that have a margin such that they do not impinge upon the vanes 8 furthest toward the outer circumferential circle side when allowed to rotate freely through 360°. For each single abovementioned vertical span the supporting columns and central main column 43 are linked or integrated so as to be able to implement a columnar multi-stage electricity generation system having a tower-like structure in which stability of the whole tower-like structure is achieved.

In propeller electricity generating systems seen in horizontal-axis types, the propeller is higher than the pylon, and thus there have been accidents in which the propeller itself is struck by lightning and damaged, or the nacelle at the top of the pylon is struck by lightning and the nacelle catches fire. The water/wind turbine of the present invention has a structure in which everything fits inside the tower-like structure, and thus if necessary lightning accident prevention measures can be implemented by installing a lightning rod at the top of the tower-like structure and arranging that the tower-like structure fits within a downward conical protective angle of 60° per side from the distal end of the lightning rod.

Making use of the characteristic that the wind turbine functions with a vertical axis, advantages arise in that in addition to generating electricity it is possible to suppress strong winds at the sides of building structures and Karman vortices and other wind hazards generated to the rear thereof that arise when building-induced wind blows directly, by installing individual wind turbines or multi-stage wind-powered electricity generators in a system having a tower-like structure in corners and inclined portions of buildings, where building-induced winds collect, as wind which has passed through the wind turbine diffuses at the rear of the wind turbine.

Since the wind/water turbine is a vertical-axis type, the total volume required for the wind/water turbine to rotate and function is approximately the same as the blades used therein, and it thus has the characteristic that space can be used more effectively than with a horizontal-type wind turbine, and installation is even possible in limited narrow spaces such as above or below, on the sides of, or at the front and back of a vehicle, and water turbines can for example be installed at the sides or at the front and back of a ship, and thus they exhibit the characteristic that the force entering a wind/water turbine generated when means of transportation on land and sea move forward can all be captured by a drag-type blade and used efficiently with reduced waste.

Winds at sea are stronger and have a more stable wind direction than on land, and therefore much use should be made thereof, but floats or ships which form the foundation on which a wind turbine is installed are constantly vibrated from front to back and side to side, and thus with propeller-type horizontal-axis type wind turbines, known as lift-type, or vertical-axis type darrieus-type or giromill-type wind turbines the flow of air on the surface of the blades is disturbed by the vibration, and this has an adverse effect on the lifting force rotation, and in some cases rotation stops completely, but since the wind turbine of the present invention is a drag type, wind that pushes the driven face stays within the circular arc of the blades and continues to push even if there is a certain amount of vibration about the rotating shaft, causing the wind turbine to rotate before escaping, and thus it has the characteristic that its operation is less susceptible to the effects of vibration than lift-type wind turbines.

INDUSTRIAL APPLICABILITY

Depletion of various resources has become an issue in recent years, and oil and coal, which are central to energy supply, are in a similar situation, and many experts are predicting a crisis situation in which fighting occurs over the limited remaining resources. Many developed countries having technical capabilities are proactively promoting the use of renewable energy (solar energy, wind energy, hydro energy, geothermal energy, biomass energy) as an alternative, and the present invention is an invention which makes energy utilization possible using wind power and hydro power.

The wind in Japan is said to have a relatively low wind speed, with much mountain wind, considered suitable for vertical-axis type wind-powered electricity generators, but in practice horizontal-axis type propeller-type wind-powered electricity generators that operate using a lifting force have been widely adopted. This has been for the reason that vertical-axis types have a poor power generation efficiency and rotate at low speed, and countermeasures against typhoons are difficult to implement, but the present invention has better mobility than conventional vertical-axis type wind-powered electricity generators and generates higher rotation than many similar types of machine, and it also makes it possible to implement typhoon disaster countermeasures simply and quickly, and it is thus possible that it will come into use as a vertical-axis type wind-powered electricity generator, which is the type that was originally considered suitable for the wind conditions in Japan.

Starting with regional banks, global financial institutions such as the Asian Development Bank have begun large-scale financing of ecological power generation projects such as solar, wind and hydroelectric power. The wind/water turbine of the present invention makes it possible to perform electricity generation using wind power and hydro power, and attention is being focused on the aspects that it has higher torque than other methods and higher rotation than other machines of the same type, and it is thus being used.

EXPLANATION OF THE REFERENCE NUMBERS

1 Rotating shaft
2 Center of circle
3 Support plate
4 Blade line shape
5 Blade line shape centered at point A
6 Blade line shape centered at point B
7 Vane rotating shaft
8 Vane
9 Length of vane wind-in (L3)
10 Shaft for simple fixing of vane
11 Shaft for stopping vane rotation
12 Temporary fixing for vane and the like
13 Direction of rotation of water/wind turbine
13a Direction of rotation of wind turbine
13b Direction of rotation of water turbine
14 Water flow/airflow
15 Airflow
16 Water flow
17 Fully open convex blade
18 Fully closed concave blade
19 Outer circumferential circle
20 Internal vortex
21 Range of vane rotation when operating as a wind turbine
22 Range of vane rotation when operating as a water turbine
23 Range of vane rotation when avoiding danger in a wind turbine
24 Range of vane rotation when avoiding danger in a water turbine
25 Vane wind-in introduction pipe
26 Space between vane rotating shafts (L1)
27 Length of short side (lateral side) of vane when operating (L2)
28 Length of short side of vane when avoiding danger (L2-L3)
29 Furring strip
30 Cross rail
31 Supporting column
32 Support plate reinforcing panel
33 Rotation transmission pulley
34 Drive pulley
35 Electrical generator
36 Bearing
37 Balloon-1
38 Balloon-2
39 Spoiler
40 Carrying pole
41 Tow rope
42 Wind-powered electricity generator (parallel)
43 Main column
44 Pipe with rotating shaft flanges
45 Coupling flange
46 Anchor
47 Support plate reinforcing flange
48 Upper rotating flange
49 Rotating upper fixing
50 Vane rotating shaft wind-in motor
51 Vane rotating shaft rotating coupling rod

The invention claimed is:

1. A turbine comprising:
arcuate circular arc blades that are rotationally symmetrical around a rotating shaft;
a construction in which an extension of a blade line shape is split into three or more intervals, at the boundaries between which there are vane rotating shafts both ends of which are fixed by support plates; and
vanes which increase the rotational efficiency, where one of the vertical sides of each of the vanes is attached to a vane rotating shaft, the vanes are each free to rotate individually from an adjacent vane rotating shaft on one side to an adjacent vane rotating shaft on the other side so that the vane is capable of contacting the adjacent vane rotating shaft on one side and the other adjacent vane rotating shaft on the other side,
wherein the shape of the blade line shape is an arcuate blade line shape along a circular arc extending from the center point of the circle of the support plate to the outer circumferential circle thereof, where the center point of the circular arc is located approximately on a line connecting a point A and a point B, the circle of the support plate having a first imaginary line and a second imaginary line that pass through the center of the circle of the support plate and that are perpendicular to each other, where the point A is located on a first straight line parallel to the first imaginary line and located at distance from the second imaginary line by a length of the radius of the circle of the support plate, the first straight line being located at distance from the first imaginary line by one half of the radius of the circle of the support plate, and the point B is located on a second straight line parallel to the first imaginary line and located at distance from the second imaginary line by 1/3.1 times of the radius R of the circle of the support plate, the second straight line being located at distance from the first imaginary line by 1/2.3 times of the radius of the circle of the support plate.

2. The turbine as claimed in claim 1, wherein part of the vanes in the vicinity of where they attach to the vane rotating shafts is wound onto the vane rotating shaft or drawn in the vane rotating shaft such that the length of the horizontal side of the vanes is made shorter than the distance between the adjacent vane rotating shafts on either side, thereby allowing the vanes to rotate freely through 360° around the vane rotating shafts, and a pivoting force of the turbine is lost.

3. The turbine as claimed in claim 1, wherein the turbine is a water turbine following a water flow on a downstream side, wherein when the blade facing the water flow is convex, the vanes open and rotation occurs with a reduced rotational resistance, and when the blade facing the water flow is concave, a driven face is formed before being driven by a hydro power, by means of an opening/closing action of the vanes matching the speed of rotation of the rotating shaft depending on the intensity of the force.

4. The turbine as claimed in claim 1, wherein the turbine is a wind turbine; when the blade facing the airflow is convex, the vanes open and rotation occurs with a reduced rotational resistance, when the blade facing the airflow is concave, a driven face is formed before being driven by a wind power, by means of an opening/closing action of the vanes matching the speed of rotation of the rotating shaft depending on the intensity of the force.

5. The turbine as claim in claim 4, wherein the vanes are made lightweight such that they are moved easily to the upwind side by means of wind which flows around to the inside of the circular arc when the blade line shape is in a location approximately the same as the upwind direction close each of the spaces between the vane rotating shafts on the upwind side.

6. The turbine as claim in claim 5, wherein when a part of the vanes in the vicinity of where they attach to the vane rotating shafts is wound onto the vane rotating shaft or drawn in the vane rotating shaft such that the length of the horizontal side of the vanes is made shorter than the distance between the adjacent vane rotating shafts on either side, allowing the vanes to rotate freely through 360° around the vane rotating shafts, the vane at the utmost outer circumferential side of the support plates is not fixed to a rotating shaft; and when a part of the vanes in the vicinity of where they attach to the vane rotating shaft is not wound onto the vane rotating shaft or drawn in the vane rotating shaft, a vane at an utmost outer circumferential side of the support plates is fixed to a rotating shaft.

7. The turbine as claimed in claim 1, wherein the circle of the support plate is divided to four areas by the first imaginary line and the second imaginary line and both the point A and point B are located in a single area of the four areas.

8. The turbine as claimed in claim 2, wherein the vane comprises a material which has tensile strength.

9. The turbine as claimed in claim 2, wherein when the length of the horizontal side of the vanes is made shorter than the distance between the adjacent vane rotating shafts on either side, all of the vanes are in a form in which they flutter in the water flow/airflow, thereby the resistance of the turbine is reduced.

\* \* \* \* \*